United States Patent [19]
Marcus

[11] Patent Number: 6,074,074
[45] Date of Patent: Jun. 13, 2000

[54] LIGHTING STRIP AND METHOD FOR PRODUCTION

[75] Inventor: Armin Marcus, Wuppertal, Germany

[73] Assignee: Happich Fahrzeug-und Industrieteile GmbH, Wuppertal, Germany

[21] Appl. No.: 08/891,359

[22] Filed: Jul. 10, 1997

[30] Foreign Application Priority Data

Jul. 11, 1996 [DE] Germany .......................... 196 27 856

[51] Int. Cl.[7] .............................................. F21V 21/005
[52] U.S. Cl. .......................... 362/240; 362/234; 362/800
[58] Field of Search .................................. 362/227, 234, 362/240, 244, 249, 250, 252, 800; 439/699.1, 56

[56] References Cited

U.S. PATENT DOCUMENTS

| | | | |
|---|---|---|---|
| 3,500,036 | 3/1970 | Szentveri | 362/152 |
| 4,173,035 | 10/1979 | Hoyt . | |
| 4,204,273 | 5/1980 | Goldberg | 362/240 |
| 4,761,720 | 8/1988 | Solow . | |
| 5,084,804 | 1/1992 | Schairer . | |
| 5,155,669 | 10/1992 | Yamuro . | |
| 5,321,593 | 6/1994 | Moates . | |
| 5,330,368 | 7/1994 | Tsuruzono . | |
| 5,336,345 | 8/1994 | Gustafson et al. . | |
| 5,496,427 | 3/1996 | Gustafson et al. . | |
| 5,528,476 | 6/1996 | Fenton | 362/249 |

FOREIGN PATENT DOCUMENTS

| | | |
|---|---|---|
| WO 92/14092 | 8/1992 | European Pat. Off. . |
| 0 606 006 A1 | 7/1994 | European Pat. Off. . |
| 0 677 695 A2 | 10/1995 | European Pat. Off. . |
| 0 760 448 | 3/1997 | European Pat. Off. . |
| 2 283 565 | 3/1976 | France . |
| 15 16 677 | 7/1970 | Germany . |
| 38 35 942 A1 | 4/1990 | Germany . |
| 44 05 729 A1 | 8/1994 | Germany . |
| 44 06 364 A1 | 8/1995 | Germany . |
| 44 12 772 A1 | 10/1995 | Germany . |
| 2 215 024 | 9/1989 | United Kingdom . |
| 2 284 306 | 5/1995 | United Kingdom . |
| WO 088/02459 | 4/1988 | WIPO . |

OTHER PUBLICATIONS

European Patent Office Search Report (Mar. 13, 1998) for foreign counterpart application EP 97 11 0952.
European Patent Office, Search Report (Nov. 25, 1997) for foreign counterpart application EP 97110952.5.
German Patent Office, Search Report (Jan. 14, 1997) for foreign counterpart application DE 196 27 856.2.

*Primary Examiner*—Y. Quach
*Attorney, Agent, or Firm*—Ostrolenk, Faber, Gerb & Soffen, LLP

[57] ABSTRACT

A lighting strip is provided having a multicore conductor strip and LED elements which are arranged in a row one behind the other. The conductor strip is composed of a large number of conductor strip sections which are cut to length and are arranged in a row in the axial direction. A printed circuit board is in each case arranged between two axially adjacent conductor strip sections and is electrically conductively connected to them. Each printed circuit board is fitted with an LED element.

24 Claims, 6 Drawing Sheets

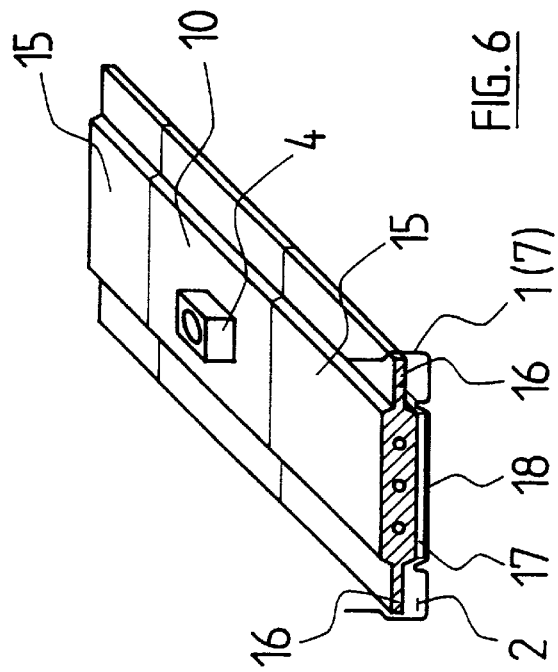
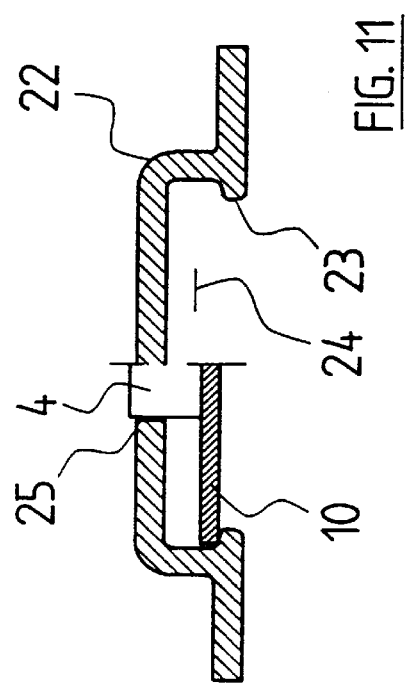
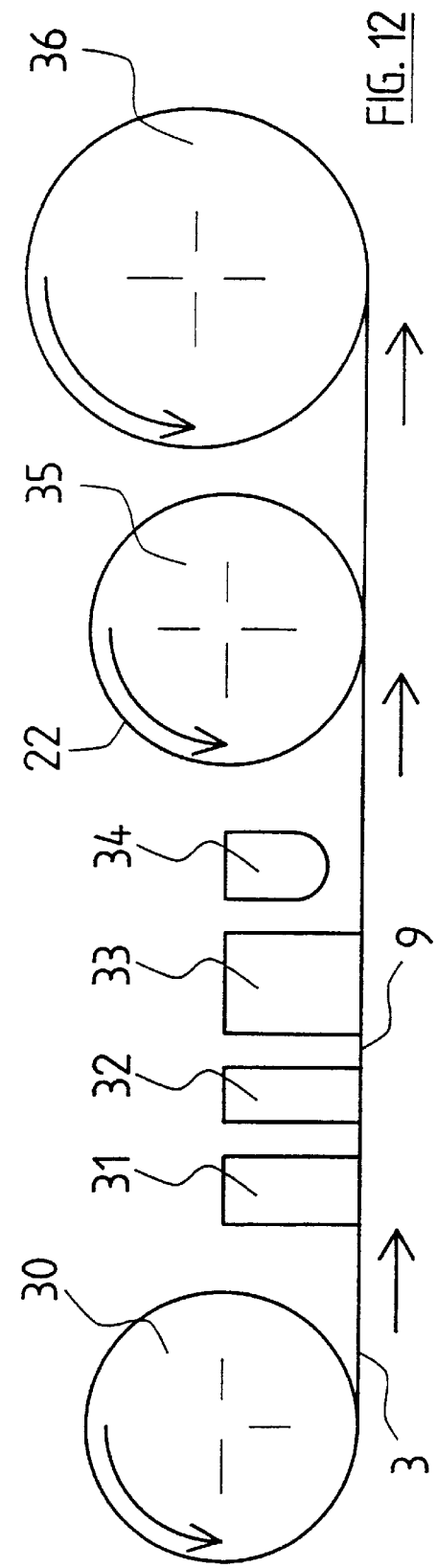

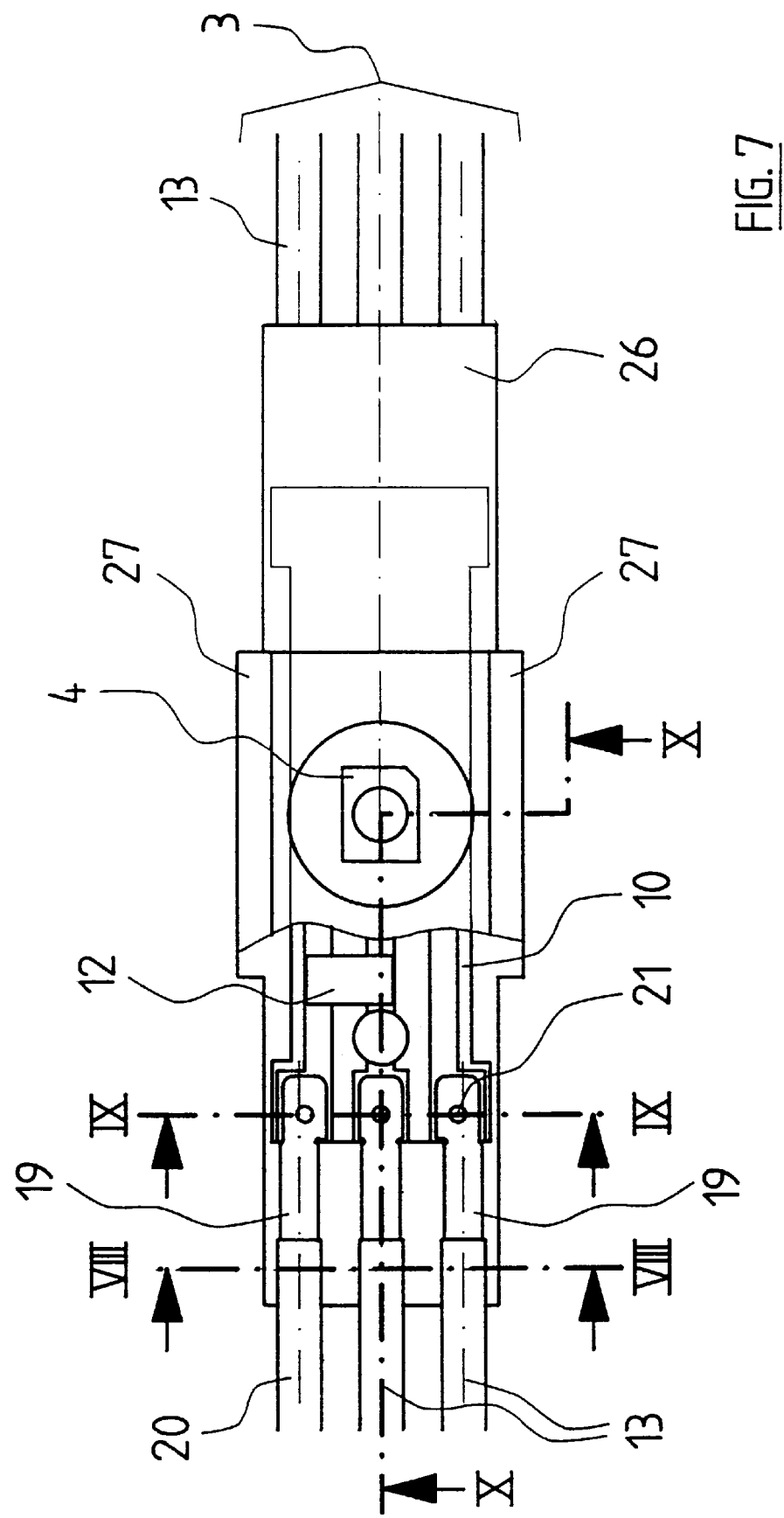

LIGHTING STRIP AND METHOD FOR PRODUCTION

BACKGROUND OF THE INVENTION

The invention relates to a lighting strip having a multicore conductor strip and is fitted with LED elements which are arranged in a row one behind the other.

A lighting strip of the type mentioned above is disclosed in EP-0 669 492 A1. In the case of this known lighting strip, a conductor strip is provided which is composed of a so-called "Kaplan film". This is a plastic strip which is provided with a metal coating and in which the conductor tracks are exposed by etching away regions of the metal coating. Lighting means, called LED elements for short in the following text, are soldered onto this conductor strip at predetermined intervals. The production of the conductor strip is based on a relatively costly technology, requires a large number of process steps, and is dependent on the use of high-quality materials. Although, as a rule, the film strip which is provided with conductor tracks is provided with a coating, sealing problems have occurred in practice and it has been found that the film strip is difficult to lay, particularly in corner regions (risk of kinking), and is also highly sensitive to scratching.

SUMMARY OF THE INVENTION

Based on a lighting strip of the type mentioned initially, the invention relates to the object of equipping this lighting strip with a conductor strip which is intended to be simple and cost-effective to manufacture, assemble and install, and which can be characterized by high functional reliability.

The lighting strip which is intended to achieve this object and has a multicore conductor strip and is fitted with LED elements which are arranged in a row one behind the other, is distinguished according to the invention by the fact that the conductor strip is composed of a large number of conductor strip sections which are cut to length and are arranged in a row in the axial direction, and that a printed circuit board is in each case arranged between two axially adjacent conductor strip sections and is electrically conductively connected to them, and that each printed circuit board is fitted with an LED element.

These measures according to the invention provide a lighting strip having a conductor strip which can be manufactured and marketed considerably more economically than the known prior art. Laying of the conductor strip or illumination strip within the corresponding channels in the lighting strip is now simplified, particularly in the region of sharp corners.

The invention provides, in a preferred manner, in the case of the lighting strip according to the invention that the individual cores of the conductor strip are sheathed with insulation, that the insulation is removed at the end regions of each conductor strip section, and that the connection between the respective end of a conductor strip section and the respective printed circuit board is produced by electrically conductive contact elements, a crimped joint being provided in each case between the contact elements and the cores of the conductor strip section, and a rivetted joint being provided in each case between the contact elements and the conductor tracks on the printed circuit board. As trials have shown, an electrical connection between the stripped end regions of the conductors and the conductor tracks on the printed circuit board can be produced particularly easily and economically by means of metallic contact elements, and, in particular, above all by an extremely reliable process.

According to one particular development of the invention, the end regions of the conductor sections, the contact elements, the printed circuit boards and the LED elements are in each case encapsulated in a coloured plastic housing which leaves exposed only the light outlet side of the LED elements and is formed by direct overmoulding. This measure additionally protects the electrical junction points but, above all, a reliable seal is achieved so that the lighting strip can be laid even in humid rooms or even under water, to be precise without any risk of a short circuit.

Another preferred refinement of the invention consists in that the end regions of the conductor strip sections, the contact elements, the printed circuit boards and the LED elements are in each case encapsulated in a plastic housing which is formed by direct over-moulding with a transparent plastic material, such as polycarbonate. In the case of this method, it is unnecessary to leave the light outlet side of the LED elements free. Furthermore, this allows a development to be achieved in that each plastic housing has, on the light outlet side of the LED elements, an integrally formed material attachment for fitting engagement in a cover of the lighting strip, which cover is provided with corresponding retaining openings. This makes it possible to provide a cover of a lighting strip from the start with openings, such as holes, which can be arranged in a row one behind the other, or else to re-equip already existing strips, such as skirting, staircase strips or the like, in that the covers of these strips are provided with any required hole pattern.

The invention provides various development measures in an effort to achieve economic manufacture of the conductor strip or illumination strip. A first measure provides that the conductor strip is composed of individual wires which each have insulation, while a second measure provides that the conductor strip is designed in the manner of a flexible ribbon cable. Commercially available wires or ribbon cable can be used in both cases, it being possible to lay these without any problems whatsoever, even at difficult junction points or in corner regions, because of their high flexibility.

Another refinement of the invention provides, instead of this, that the conductor strip is composed of an extruded, relatively dimensionally stable, profiled strip having wires incorporated in it. In this case, it is now possible for the profiled strip to be designed as a clip-on strip and/or a stick-on strip. These measures are worthwhile with relatively rigid systems, and then provide the particular advantage that the conductor strips can be fitted or attached without any additional aids, and require no additional cover.

A further contribution to simplifying the fitting of the conductor strip results according to a refinement of the invention in that the plastic housing has an approximately rectangular contour with clip-on strips, clip-on tabs or the like, which are integrally formed on the longitudinal edges, for clip-on mounting of the conductor strip in a retaining channel which is designed within the lighting strip.

The lighting strip according to the invention is furthermore characterized in that the conductor strip is arranged in a retaining channel of a covering strip composed of opaque material, which covering strip has holes arranged one behind the other in a row for the LED elements to pass through, in that the conductor strip and the covering strip are a prefabricated flush-mounted unit for arrangement in a retaining channel in the lighting strip, and in that this flush-mounted unit is covered, and is held in the correct position, by a sealing profiled strip which likewise engages in the retaining channel, is in this case held in a force-fitting and/or positively-locking manner, and is composed of a transparent plastic material.

In the case of a lighting strip having a multicore conductor strip and is fitted with LED elements which are arranged in a row one behind the other, the invention can also be implemented in that the conductor strip is composed of a copper strip whose cores are separated from one another by punched slots and cut-free sections, and in that the conductor strip, including the surface-mounted LED elements, resistors and the like, is surrounded by a flexible sheath profile which is extruded thereon and is formed from a transparent plastic material. Such a conductor strip or illumination strip provides absolute sealing, of course, which is alternatively provided in another embodiment according to the invention, according to which, in the case of a lighting strip having a multicore conductor strip and is fitted with LED elements which are arranged in a row one behind the other, it is provided that the conductor strip is composed of a plastic film strip, copper strips coated on to it and surface-mounted LED elements, resistors and the like, and of a flexible sheath profile which is extruded thereon and is formed from a transparent plastic material. In both cases, the flexible sheath profile can be equipped on the underneath with a double-sided adhesive tape, provided with a protective film, in order to make it easier to fit the conductor strip in the corresponding retaining channel in the lighting strip.

The lighting strip according to the invention can be designed, in particular, as a handrail, staircase, baggage compartment, skirting or escape route marking strip.

A method for manufacturing an insulated, multicore conductor strip having LED elements which are arranged in a row one behind the other, for a lighting strip, is characterized according to the invention in that a conductor strip of finite length is split into conductor strip sections of predetermined length, and in that those end regions of the conductor strip sections which are axially adjacent each have a printed circuit board connected to them, which printed circuit board is fitted with an LED element and, possibly, with a resistor. In this case, the operations of cutting a conductor strip section to length and of connecting a printed circuit board are in each case carried out intermittently.

In particular, a method is provided, with the following method steps, which are in each case repeated intermittently:

1. a conductor strip of finite length is drawn off a supply roll and is fed to a cutting station;
2. a conductor strip section of predetermined length is cut to length from the conductor strip of finite length, and the conductor strip section is held firmly by a holding device;
3. the mutually adjacent end regions of the conductor strip and the conductor strip section are stripped of insulation;
4. the stripped end regions are positioned;
5. a printed circuit board which is fitted with at least one LED element is supplied;
6. an electrical connection is produced between the stripped end regions and the conductor tracks on the printed circuit board; and
7. the conductor strip section which is connected via the printed circuit board to the conductor strip again is passed on to a spool drum.

Method steps two, three and four are preferably carried out simultaneously in the cutting station.

It is furthermore preferably provided that, between the sixth and the seventh method step, the printed circuit board is fed to an overmoulding station and, in the same way as the end regions of the conductors which are connected to the printed circuit board, is overmoulded here with a plasticized coloured plastic material, the light outlet side of the LED element being kept free of the overmoulding material. This measure is particularly advantageous with respect to precluding sealing problems and for lighting strips which are provided with a coloured cover which leaves only the light outlet side of the LED elements free.

Alternatively, it can advantageously be provided that between the sixth and the seventh method step, the printed circuit board is fed to an overmoulding station and, in the same way as the end regions of the conductors which are connected to the printed circuit board, is overmoulded here with a plasticized transparent plastic material. This measure is likewise particularly advantageous with respect to avoiding sealing problems and for lighting strips having a covering strip which has a row of holes.

It can furthermore be provided that the seventh method step is preceded by a method step in which the conductor strip is supplied with a flexible covering strip from a supply roll, and said flexible covering strip is connected to the conductor strip and/or to the printed circuit boards.

A measure which is particularly worthy of recommendation is that a functional test is carried out after the sixth method step and/or after each printed circuit board has been overmoulded.

Exemplary embodiments of the invention will be explained in more detail in the following text.

BRIEF DESCRIPTION OF THE DRAWINGS

FIG. 6 depicts a perspective view of yet another embodiment of a conductor strip.

FIG. 7 depicts a partial cut-away of a plan view of a connecting region between conductor strips and a printed circuit board.

FIG. 11 depicts a cross-sectional view through a printed circuit board covering strip connection.

FIG. 12 depicts a schematic illustration of the production method.

DETAILED DESCRIPTION OF THE PREFERRED EMBODIMENTS

Figure 1:
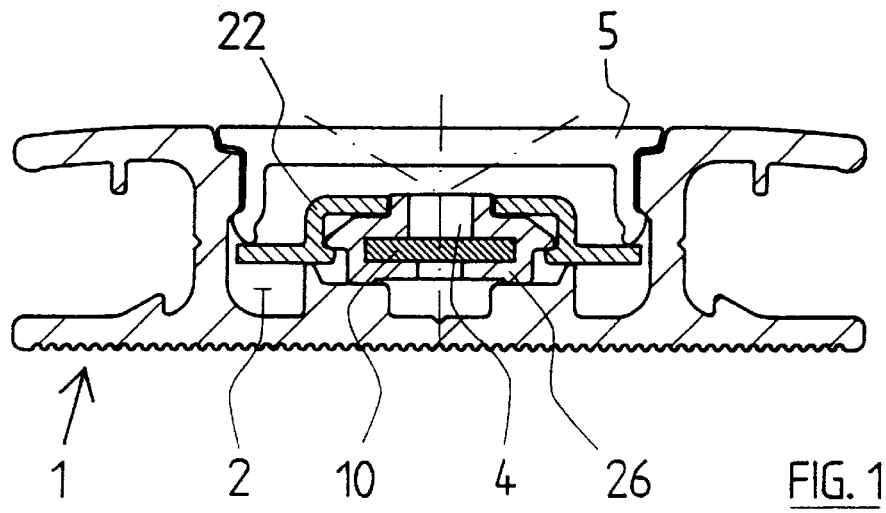
FIG. 1 depicts a cross-sectional view of a first embodiment of a lighting strip.

FIG. 1 shows a lighting strip for use as a floor strip 1. Alternatively, the lighting strip can be designed as a handrail, staircase, baggage compartment, skirting or escape route marking strip. The lighting strip is in general composed of aluminum or an aluminum alloy, but can, of course, also be manufactured from a plastic material. A multicore conductor strip 3, which is fitted with LED elements 4 which are arranged in a row one behind the other, is arranged in a retaining channel 2 in the lighting strip. The retaining channel 2 is closed at the top by a sealing profiled strip 5 composed of a transparent material. The sealing profiled strip 5 is composed, for example, of polycarbonate.

Figure 2:
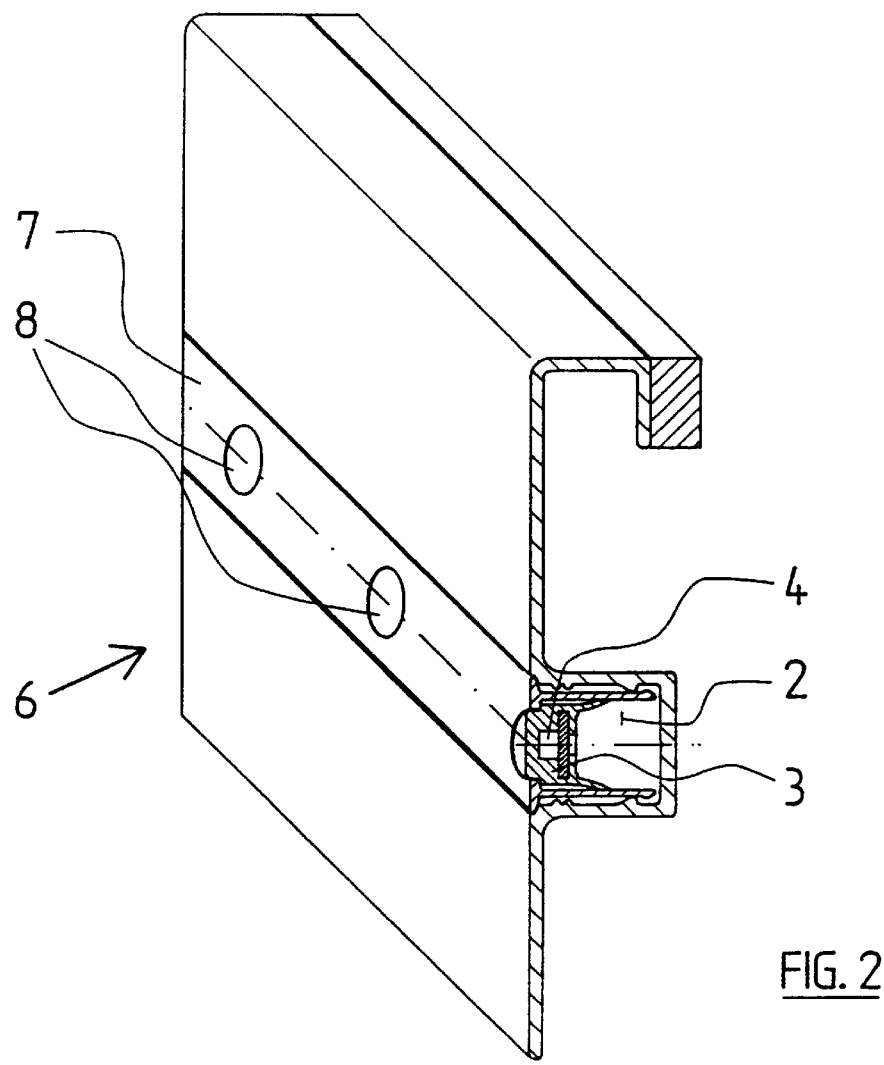
FIG. 2 depicts a perspective cross-sectional view of a second embodiment of a lighting strip.

FIG. 2 shows a lighting strip for use as a skirting or wall strip 6. This strip also has a retaining channel 2 and a multicore conductor strip 3, which is fitted with LED elements 4 that are arranged in a row one behind the other. The skirting or wall strip 6 is in this case also composed of aluminum, an aluminum alloy or plastic. And, this also applies to the sealing profiled strip 7, which is provided with openings 8 for light to emerge from.

Figure 3:
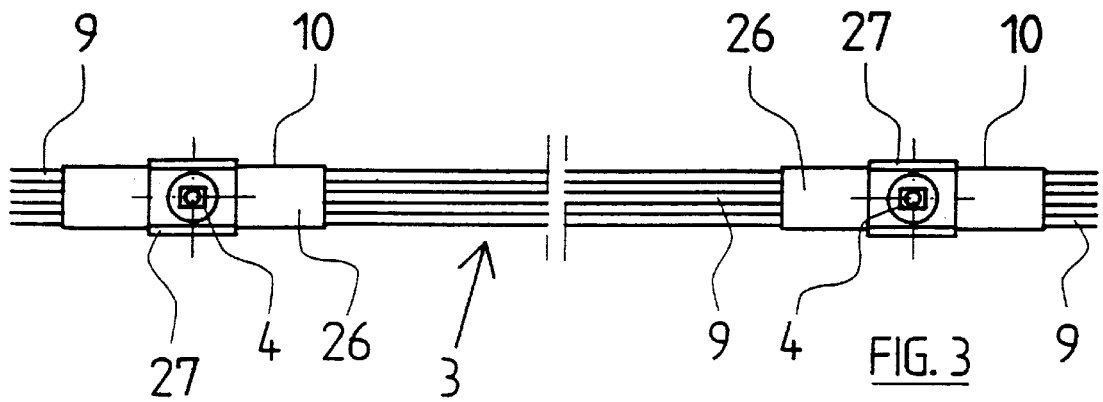
FIG. 3 depicts a plan view of a conductor strip having lighting means.

FIG. 3 shows a multicore conductor strip 3, which is composed of a large number of conductor strip sections 9 that are cut to length and are arranged in a row in the axial direction. Printed circuit boards 10 are arranged between the conductor strip sections 9, are electrically conductively connected to said conductor strip sections 9 and are provided in a conventional manner with conductor tracks, which are not illustrated in more detail, for example in the manner of a printed circuit. The printed circuit boards 10 are also fitted with an LED element 4 connected to them, and possibly with a resistor 12 (cf. FIG. 7). The conductor strip 3 may have any required number of cores depending on the respectively desired type of illumination, such as permanent illumination or, possibly, moving light.

Figure 4:
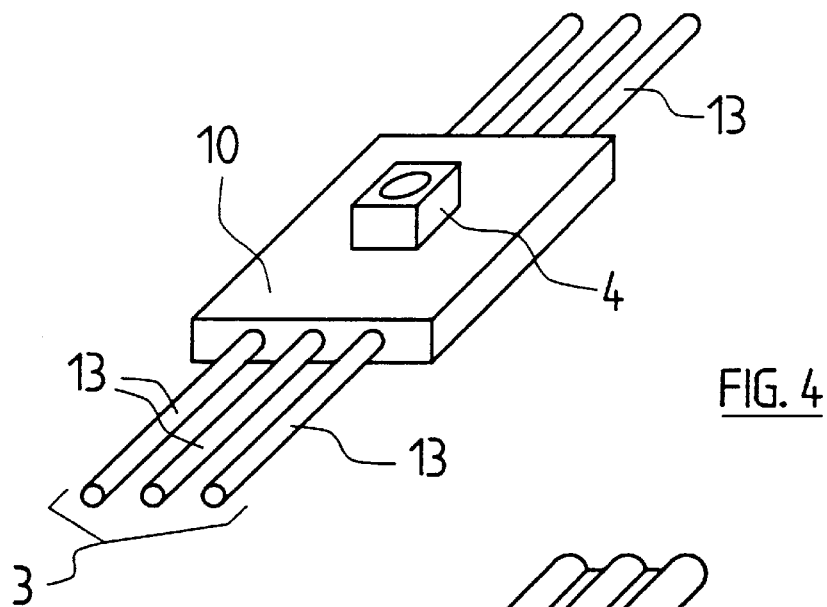
FIG. 4 depicts a perspective view of an embodiment of a conductor strip.
Figure 5:
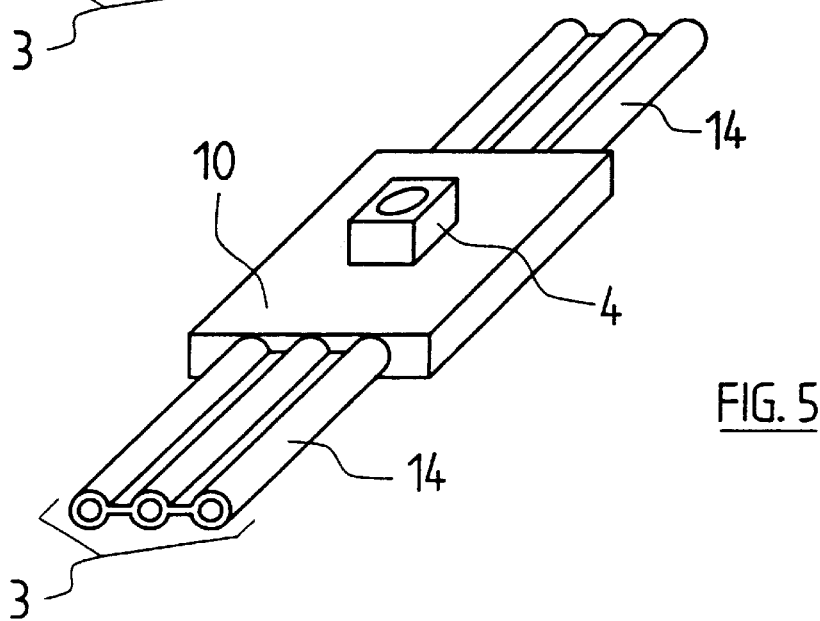
FIG. 5 depicts a perspective view of another embodiment of a conductor strip.

While the conductor strip 3, according to FIG. 3, is designed with five cores, the conductor strip 3 in FIGS. 4 and 5 is composed of three cores in each case. In this case, as is shown in FIG. 4, the conductor strips 3 may be formed from individual wires 13 each having insulation or, as is shown in FIG. 4, like a flexible ribbon cable 14. In both cases, the conductor strip 3 is split into conductor strip sections 9, and their end regions are in each case connected to a printed circuit board 10 which is fitted with at least one LED element 4.

It is also possible to form a conductor strip 3 from an extruded, relatively dimensionally stable, profiled strip 15 having insulated or uninsulated conductor wires incorporated therein, and then to split it into conductor strip sections 9. This option, which is shown in FIG. 6, has the advantage that clip-on tabs 16 can be integrally formed on the conductor strip 3 for simple clip-on mounting of the conductor strip 3 in the retaining channel 2 in the respective lighting strip. Furthermore, the profiled strip 15 can be equipped on the bottom with a double-sided adhesive tape 17, so that the profiled strip 15 can be stuck to the bottom of the retaining channel 2 after a protective film 18 has been pulled off. Furthermore, in the example according to FIG. 6, profiled strip sections 15 and printed circuit boards 10 which are fitted with LED elements 4 alternate with one another.

FIG. 7 shows the cable assembly with a printed circuit board 10. The example shows three wires 13 of various colours, for example red for the positive terminal, black for the negative terminal and white for the neutral conductor. These wires are electrically conductively connected to the printed circuit board 10. A ribbon cable 14 according to FIG. 5, or a profiled strip 15 according to FIG. 6, can also be provided instead of the individual wires 13 of each conductor strip section 9. In the example according to FIG. 7, the printed circuit board 10 is fitted with an LED element 4 and a resistor 12.

Figure 8:
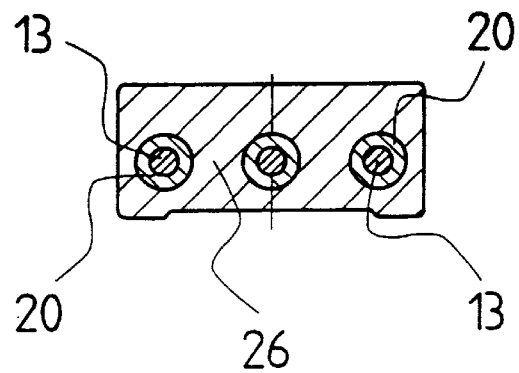
FIG. 8 depicts a cross-sectional view along the line VIII—VIII in FIG. 7.
Figure 9:
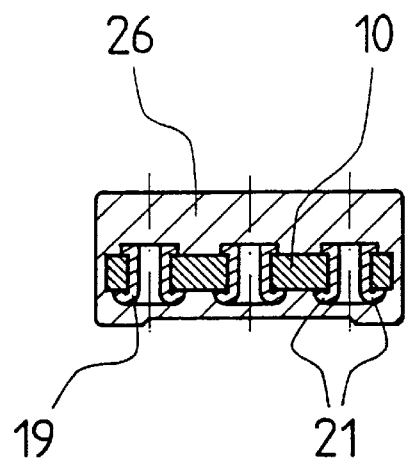
FIG. 9 depicts a cross-sectional view along the line IX—IX in FIG. 7.
Figure 10:
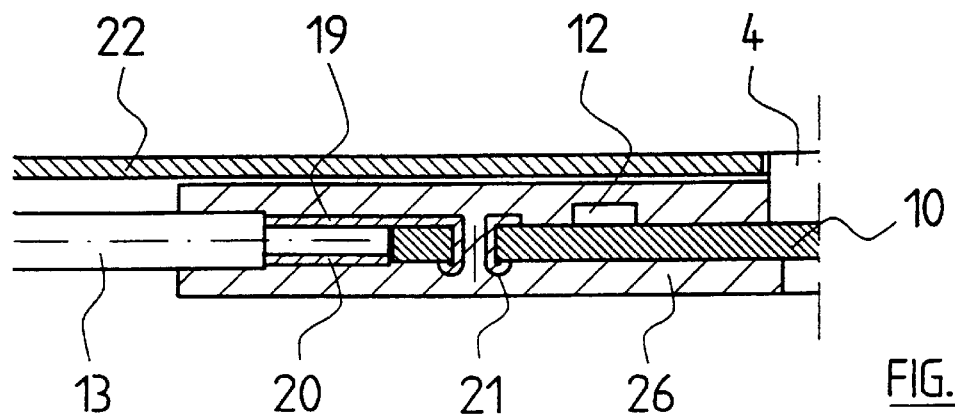
FIG. 10 depicts a cross-sectional view along the line X—X in FIG. 7.

The cable assembly is preferably manufactured by means of electrical contact elements 19. A crimped joint 20 is provided in each case between the contact elements 19 and the cores of the wires 13 (see also FIG. 8). A rivetted joint 21 is provided in each case between the contact elements 19 and the conductor tracks on the printed circuit board 10 (see also FIG. 9). The joints 20 and 21 can also clearly be seen in the longitudinal section illustration according to FIG. 10.

After the production of the cable assembly between a large number of conductor strip sections 9 and a large number of printed circuit boards 10 which are fitted with LED elements 4, this unit is mated with a covering strip 22, according to FIG. 11, to produce a simple embodiment of a lighting strip that does not require waterproof sealing of the electrical junction points. The covering strip 22 has a channel 24 which is constricted by latching tabs 23 and makes it possible to clip in the printed circuit board 10. The covering strip 22 furthermore has openings 25, which are arranged in a row one behind the other, for the LED elements 4 to pass through. The subject of FIG. 11 can now be introduced into a retaining channel 2 in a floor strip 1, for example, and can be supported and held therein by the self-locking sealing profiled strip 5, as is shown in FIG. 1.

For lighting strips in which there must be no sealing problems, it is preferably provided that the end regions of the conductor strip sections 9, the contact elements 19, the printed circuit boards 10 and the LED elements 4 are in each case encapsulated in a coloured plastic housing 26 that leaves exposed only the light outlet side of the LED elements 4 and is formed by direct overmoulding. The plastic housing 26, shown in FIGS. 7 through 10, can also be designed with integrally moulded clip-on strips 27 for a mounting arrangement in a covering strip 22 (see also FIG. 11).

The plastic housing 26 may also be composed of a transparent material and may also encapsulate the light outlet side of the LED elements 4 as well. In this case, it is recommended that a material attachment, which is not illustrated in more detail, be integrally formed on the light outlet sides of the individual LED elements 4, for fitting engagement in the retaining openings 8 in the sealing profiled strip 7 (FIG. 2).

A manufacturing apparatus, which is shown in a schematic illustration in FIG. 12, may be used to carry out the method for manufacturing an illumination strip for a lighting strip. This method is described, by way of example, for manufacturing the lighting strips depicted in FIGS. 1 and 2. In this case, a conductor strip 3 of finite length is drawn off a supply roll 30 and is fed to a cutting station 31. The cutting station 31 is equipped with tools which divide the conductor strip 3 into conductor strip sections 9 by cutting in each case, in order then to strip the insulation off the mutually adjacent end regions of the conductor strips 3 and the conductor strip section 9. The tools hold the stripped end regions firmly and move so far apart from one another that, in a feedstation 32, the contact elements 19 can firstly be forced against the stripped end regions in order to produce a crimped joint 20, and can be forced against the supplied printed circuit board 10 in order to produce a rivetted joint 21 (see FIG. 7). Depending on the tool design, the cutting station 31 and the feed station 32 may physically coincide, or else be physically separated from one another.

The respectively supplied printed circuit board 10 is equipped at least with a premounted LED element 4, and possibly also with a premounted resistor 12 (see FIG. 7). The printed circuit board 10, which is electrically conductively connected to the cable ends, is transported onward, and is fed to an overmoulding station 33.

In the overmoulding station 33, the printed circuit board 10 is then overmoulded, together with the contact elements 19 and the end regions of the conductors connected to the printed circuit board 10, with plasticized plastic material. If a coloured plastic material is used, the light outlet side of the LED element 4 is kept free of plastic material, while complete overmoulding and encapsulation are provided if a transparent, translucent plastic material is to be used.

The overmoulding station 33 is followed by an inspection station 34, in which a 100% light inspection is carried out.

After the light inspection, a covering strip 22 is fed to the illumination strip from a supply roll 35. Latching takes place at the same time, for example with the clip-on strips 27 of the plastic housing 26. After this, the complete illumination strip is wound onto a magazine roll 36, and is kept ready for laying in the retaining channel 2 of a lighting strip. The overmoulding may be omitted in the case of illumination strips whose requirement profile with regard to sealing is less stringent, while the supply of a separate covering strip 22 can be dispensed with in the case of illumination strips having conductor strip sections 9 which are formed from profiled strips 15.

Figure 13:
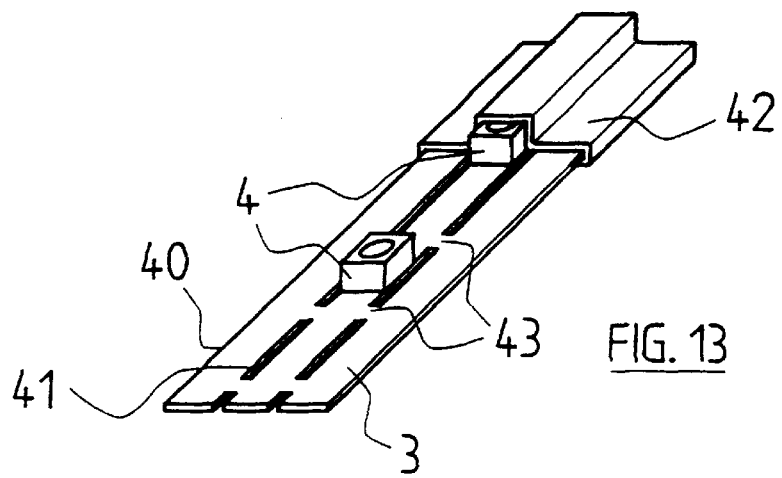
FIG. 13 depicts a perspective view of another embodiment of a conductor strip having lighting means.
Figure 14:
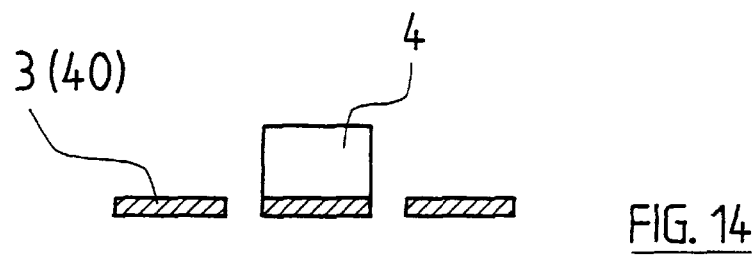
FIGS. 14–17 depict cross-sectional views of other embodiments of a conductor strip having lighting means.
Figure 15:
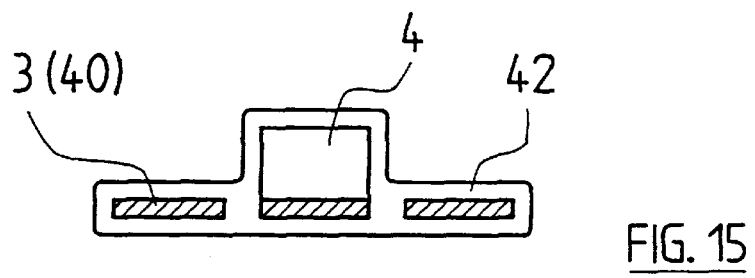

The form of implementation for manufacturing a conductor strip 3 according to FIGS. 13 to 15 is based on a stamped copper strip 40 having punched openings 41. LED elements 4 and, possibly, resistors 12 are connected in a conventional manner at predetermined intervals on the centre conductor, which is formed by the punched openings 41, of the copper strip 40, an intermittent flow method being envisaged. The unit prepared in this way is passed through a tool of an extrusion device and is sheathed here with a flexible sheath profile 42, which is composed of crystal-clear or transparent plastic material, the copper strip 40 actually being cut away in the regions 43 before sheathing, in order to separate the cores of the copper strip 40 from one another. The flexible sheath profile 42 is composed of a material which closely encloses the copper strip 40 and the lighting means and has shrinking characteristics. The illustration in FIG. 14 shows the conductor strip 3 before sheathing, and that in FIG. 15 after sheathing.

Figure 16:
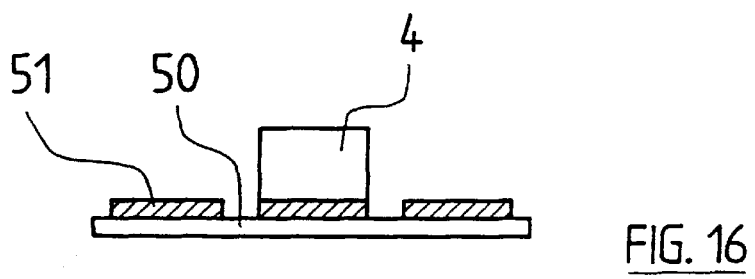
Figure 17:
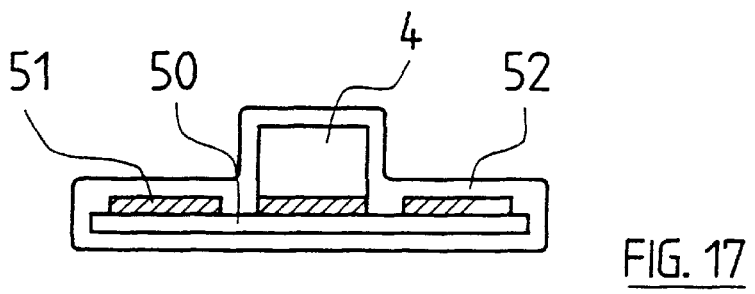

FIGS. 16 and 17 show yet another form of implementation of the illumination strip. In this case, three or more copper strips 51 are coated on a film strip 50 and are fitted, such that they are electrically conductively connected, with LED elements 4 and, possibly, resistors 12. The film strip 50 is subsequently sheathed, together with the copper strip 51 and the lighting means, with a flexible sheath profile 52 in an extrusion process, the flexible sheath profile 52 being composed of a transparent plastic material having shrinking characteristics.

With regard to the electrical circuits and the conductor routing, use is made of the prior art which is conventional to this extent, so that there is no need for any explanation relating to this. The same applies to the possible embodiments and refinements of the lighting strip as well as end, corner and cross-pieces. Reference should be made to the subject matter of EP 0 669 492 A1, mentioned above, as an example for the configurations of the lighting strip.

The measures to make the connection between the ends of the strip section 9 and the printed circuit board 10 in each case by means of electrically conductive contact elements 19 and to provide a crimped joint 20 in each case between the contact elements 19 and a rivet connection 21 between the conductors of the strip section 9 and between the contact elements 19 and the conductor tracks of the circuit board 10, have proven to be advantageous. As trials have demonstrated, however, a particularly efficient, dependable and economical electrical connection between the ends of the strip section 9 and the printed circuit board 10 in each case can be made up by soldering, brazing or in particular by welding, with the advantage that the numbers of construction components and operations are reduced.

It should be appreciated that the apparatus and method of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed is:

1. A lighting strip comprising a multicore conductor strip having a plurality of conductor strip sections of predetermined lengths arranged in an axial direction, a printed circuit board arranged between two axially adjacent conductor strip sections and electrically conductively connected to said conductor strip sections, and an LED element connected to said printed circuit board.

2. The lighting strip according to claim 1, wherein said conductor strip has at least one contact element, said conductor strip section further comprising a plurality of individual wire cores sheathed with an insulation material, said insulation material removable from at least one end of said conductor strip section whereby each of said individual wire cores is electrically conductively connected to said printed circuit board by said at least one contact element.

3. The lighting strip according to claim 2, wherein said LED element has a light outlet side, and said at least one end of said conductor strip section, said contact element, said printed circuit board, and said LED element encapsulated in a colored plastic housing that leaves exposed only said light outlet side of said LED element.

4. The lighting strip according to claim 2, wherein said at least one end of said conductor strip section, said contact element, said printed circuit board, and said LED element are encapsulated in a plastic housing which is formed by direct overmoulding with a transparent plastic material.

5. The lighting strip according to claim 4, wherein said plastic housing has, on a light outlet side of said LED element, an integrally formed material attachment for fitting engagement in a cover over the lighting strip, said cover being provided with a retaining opening for said LED element.

6. The lighting strip according to claim 1, wherein the conductor strip comprises individual wires which each have insulation.

7. The lighting strip according to claim 1, wherein the conductor strip is a flexible ribbon cable.

8. The lighting strip according to claim 1, wherein the conductor strip is an extruded, relatively dimensionally stable, profiled strip having wires incorporated in it.

9. The lighting strip according to claim 8, wherein the profiled strip includes attachment means selected from clip-on mounting, stick-on mounting and combination thereof.

10. The lighting strip according to claim 9, further comprising a plastic housing having a substantially rectangular contour with tabs integrally formed thereon for clip-on mounting of the conductor strip in a retaining channel.

11. The lighting strip according to claim 1 wherein the conductor strip is arranged in a channel of a covering strip, said covering strip having holes arranged in an axial direction for said LED element to pass through, the conductor strip and the covering strip being arranged in a prefabricated flush-mounted unit for placing in a retaining channel in the lighting strip, and the flush-mounted unit being covered and being-held in position by a sealing profiled strip which engages the retaining channel in a positively-locking manner.

12. The lighting strip according to claim 1 wherein said lighting strip is incorporated into one of a handrail, a staircase, a baggage compartment, a skirting and an escape route marking strip.

13. The lighting strip according to claim 1 wherein said conductor strip comprises a plurality of individual wire cores being jacketed with an insulation material, said insulation material being removable from at least one end of each of said individual wire cores wherein each of said individual wire cores is electrically conductively connectable to a conductor track located on the printed circuit board.

14. In a lighting strip having a multicore conductor strip and axially aligned LED elements, the improvement comprising: a conductor strip comprising a plurality of copper strips separated from one another by punched slots and cut-free sections, at least one LED element being mounted to one of said copper strips and being electrically connected to a resistor, said resistor also being electrically connected to one of said copper strips, and a flexible sheath profile surrounding said conductor strip and said LED elements, said flexible sheath profile being extrudable and being formable from a transparent plastic material.

15. In a lighting strip having a multicore conductor strip and axially aligned LED elements, the improvement comprising: a conductor strip comprising a film strip having a plurality of copper strips coated onto it, at least one LED element being mounted to one of said copper strips, said at least one LED element being electrically connected to a resistor, said resistor also being electrically connected to one of said copper strips, and a flexible sheath profile surrounding said conductor strip and said LED elements, said flexible sheath profile being extrudable and being formable from a transparent plastic material.

16. A method of manufacturing a lighting strip having at least one LED element and an insulated multicore conductor strip, the method comprising the steps of: cutting a conductor strip of finite length into at least one conductor strip section of predetermined length, connecting said at least one conductor strip section to at least one axially adjacent printed circuit board, and fitting said at least one printed circuit board with at least one LED element.

17. The method according to claim 16, wherein the steps of cutting at least one conductor strip section of predetermined length and connecting said at least one conductor strip section to at least one printed circuit board are carried out intermittently.

18. The method according to claim 16 further comprising the steps of:
 (a) drawing said conductor strip of finite length off a supply roll and feeding said conductor strip to a cutting station;
 (b) cutting said at least one conductor strip section of predetermined length from said conductor strip, and firmly holding said conductor strip section in a holding device;
 (c) stripping insulation from an end of said conductor strip section and an end of said conductor strip;
 (d) positioning said stripped end of said conductor strip section;
 (e) providing a printed circuit board having conductor tracks and at least one LED element;
 (f) connecting said stripped end of said conductor strip section and said conductor tracks of said printed circuit board to form an electrical connection therebetween;
 (g) passing said conductor strip section which is connected via the printed circuit board to said conductor strip to a spool drum; and,
 (h) repeating steps (a) through (g) intermittently.

19. The method according to claim 18, wherein method steps (b), (c) and (d) are carried out simultaneously in the cutting station.

20. The method according to claim 18, wherein the LED element has a light outlet side, said method further comprising the step of overmoulding a plasticized colored plastic material over at least the printed circuit board with the light outlet side of the LED element being kept free of the plasticized colored plastic material.

21. The method according to claim 18, further comprising overmoulding a plasticized transparent plastic material over at least the printed circuit board.

22. The method according to claim 18, further comprising the steps of drawing a flexible covering strip from a supply roll, and connecting said flexible covering strip to the conductor strip.

23. The method according to claim 18, further comprising functionally testing the printed circuit board after it has been connected to the conductor strip section.

24. The method according to claim 18, further comprising the steps of drawing a flexible covering strip from a supply roll, and connecting said flexible covering strip to the at least one printed circuit board.

* * * * *